United States Patent [19]

Alberti

[11] 4,375,932
[45] Mar. 8, 1983

[54] POWERED CARGO RESTRAINT

[75] Inventor: John Alberti, Seattle, Wash.

[73] Assignee: The Boeing Company, Seattle, Wash.

[21] Appl. No.: 261,677

[22] Filed: May 7, 1981

[51] Int. Cl.³ .................. B60P 7/08; B61D 45/00; B63B 25/22
[52] U.S. Cl. .................................... 410/69; 410/92; 410/94; 244/137 R
[58] Field of Search ............... 410/32, 69, 70, 71, 410/72, 73, 74, 75, 76, 77, 78, 79, 80, 81, 84, 94, 92; 244/137 R

[56] References Cited

U.S. PATENT DOCUMENTS

| | | | |
|---|---|---|---|
| 2,439,423 | 4/1948 | Fowler | 410/79 |
| 3,210,038 | 10/1965 | Bader et al. | 410/77 |
| 3,335,983 | 8/1967 | Mollon et al. | 410/32 X |
| 3,424,410 | 1/1969 | Galaup | 244/137 R |
| 3,493,210 | 2/1970 | Brenner | 410/94 |
| 3,698,679 | 10/1972 | Land et al. | 410/69 |
| 3,759,476 | 9/1973 | Goodwin | 410/69 |
| 3,800,713 | 4/1974 | Nordstrom | 410/79 |
| 3,810,534 | 5/1974 | Prete, Jr. | 410/69 |
| 3,927,622 | 12/1975 | Voigt | 410/79 |
| 3,933,101 | 1/1976 | Blas | 410/69 |
| 3,986,460 | 10/1976 | Voigt et al. | 410/69 |
| 4,134,345 | 1/1979 | Baldwin et al. | 410/70 |

*Primary Examiner*—Robert B. Reeves
*Assistant Examiner*—Howard Beltran

*Attorney, Agent, or Firm*—Christensen, O'Connor, Johnson & Kindness

[57] ABSTRACT

A cargo restraint for use in loading and unloading cargo in the hold of an aircraft includes a lip member which extends into the path of cargo entering the aircraft and is yieldably mounted to rotate out of the way of cargo entering the cargo hold. The lip member has stop means associated therewith to prevent rotation of the lip means on engagement by cargo in a direction exiting the cargo hold so as to restrain the cargo from exiting. The lip member is rotatably mounted on a carrier member which in turn is pivotally attached to a base affixed to the floor of the cargo hold. The lip member is movable into a retracted position below the cargo deck to permit passage of cargo out of the hold. A powered actuator is provided which is operable to move the lip member between its extended and retracted positions. A control means associated with the powered actuator is located remotely from the cargo restraint and is operable to cause movement of the lip member between its extended and retracted positions from the remote location. The lip member can be manually moved into the retracted position in the event the powered actuator is inoperative and preferably a latching mechanism is provided that is operable to maintain the lip member in its retracted position independently of the powered actuator.

11 Claims, 6 Drawing Figures

POWERED CARGO RESTRAINT

BACKGROUND OF THE INVENTION

This invention relates to cargo handling mechanisms such as those used in aircraft, and more particularly relates to a powered restraint for preventing cargo from rolling back out of the cargo hold of an aircraft once it has been loaded.

Typically, cargo is loaded into an aircraft cargo hold in containers specially constructed to utilize as much as possible the available space in the cargo hold. The cargo deck typically is comprised of a plurality of ball mats containing roller balls to ease the passage of cargo containers over the deck. While the use of such ball mats greatly enhances the ability to rapidly move cargo containers into the aircraft hold, it also makes it easier for those containers to roll back out of the cargo hold if the cargo deck is not level. It is necessary therefore to provide some type of restraining mechanism, preferably in the door of the cargo hold, which permits passage of cargo into the hold but prevents it from rolling back out of the hold.

A device for restraining cargo once it has been loaded into the cargo hold of an aircraft is described in U.S. Pat. No. 3,698,679 to Lang et al., issued Oct. 17, 1972 and incorporated herein by reference. The restraint of the Lang et al. patent includes a lip member which, in normal operation, extends above the level of the cargo floor and engages the lower edge of cargo containers passing into the hold. The lip member yields to the cargo containers passing into the cargo hold, such that the container forces the lip member below the level of the cargo floor, permitting the container to enter the hold. However, the lip member does not yield in the opposite direction. Therefore, cargo abutting the lip member from within the hold is maintained in the cargo hold by the lip member. When it is desired to unload the aircraft, the lip member of the Lang et al. cargo restraint can be manually placed in a position below the level of the cargo deck, thereby permitting cargo to pass out through the door of the cargo hold.

The Lang et al. restraint is manually operable and requires that the load master or his assistants move to the restraint in order to release it for cargo unloading. Also, if the cargo containers are to be removed one at a time it is necessary after each container passes over the restraint mechanism to manually reset the restraint to raise the lip member to its normal extended position to prevent the remaining cargo containers from exiting the cargo hold prematurely.

It is therefore an object of the present invention to provide a cargo restraint that extends into the path of travel of cargo entering and exiting a cargo hold to prevent passage of cargo in one direction and allow passage of cargo in a second and opposite direction, which restraint can be retracted out of the cargo path by a powered means.

It is a further object of this invention to provide such a cargo restraint which can be extended and retracted from a remote location.

It is another object of this invention to provide a cargo restraint of the type described above which operates in a limited space envelope.

It is an object of this invention to provide a cargo restraint which has a manual override to enable an operator to manually move the restraint between its retracted and extended positions in case the powered means is inoperative to permit the continued loading and unloading of cargo.

SUMMARY OF THE INVENTION

The powered cargo restraint of the present invention includes a carrier beam member which is pivotally mounted with respect to a base adapted for attachment to an aircraft cargo deck. The carrier member carries a lip member which extends outwardly into the path of a container approaching the mechanism. When a container contacts the lip member from a first direction in which passage is to be prevented, the lip member will rigidly transfer the resulting loads through stop means into the carrier member. The pivotally mounted carrier member is prevented from rotating by holding means, which in the preferred embodiment comprise a spring-biased, overcenter toggle linkage. When a container contacts the lip member from a second direction in which passage is to be permitted, the lip member moves to forcibly actuate a release means which disconnects the holding means, thereby allowing rotary movement of the carrier beam away from the object passing over the mechanism. The carrier beam is spring-biased to urge the lip member upwardly to maintain contact with the lower surface of the container as it passes above the mechanism and to return the lip member to its original extended position when the container has passed over the mechanism. The lip member can be retracted below the cargo path by an actuator means which rotates a retraction link mounted on the base and cooperatively engageable with the overcenter toggle linkage to release the overcenter linkage and permit the lip member to move to a position below the path of the cargo container. Preferably, the actuator means is remotely operable.

In the preferred embodiment a manually operable latching means is provided to maintain the lip member in its retracted position in the event the actuator is inoperative.

BRIEF DESCRIPTION OF THE DRAWINGS

The objects and advantages of the present invention will be better understood by those of ordinary skill in the art and others upon reading the ensuing specification in conjunction with the accompanying drawings wherein.

DESCRIPTION OF THE PREFERRED EMBODIMENT

Figure 1:
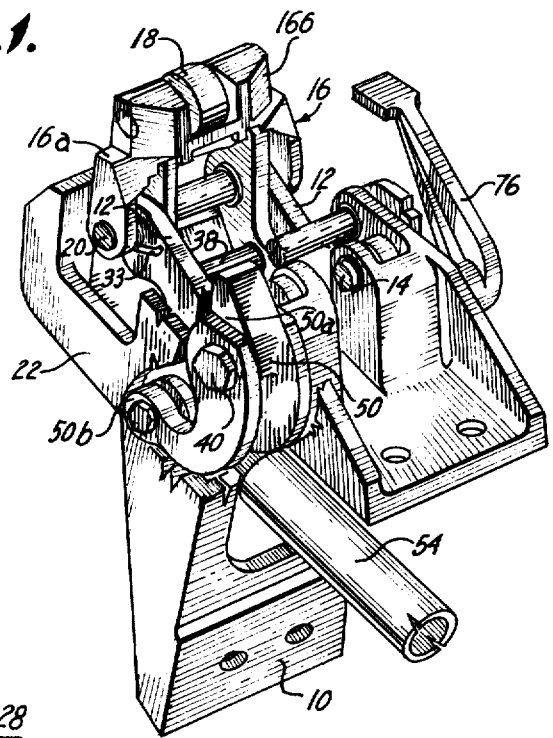
FIG. 1 is an isometric view of one embodiment of a cargo restraint made in accordance with the principles of the present invention with portions thereof removed for ease of view.

One embodiment of a powered cargo restraint made in accordance with the principles of the present invention is illustrated in FIG. 1. A base 10 is appropriately designed for attachment to the doorsill of a cargo hold in an aircraft or other conveyance. A portion of the base has been removed in FIG. 1 to permit viewing of the internal mechanism of the restraint. A pair of carrier beams 12 are pivotally mounted on the base by pins 14 which are supported between clevis elements of the base 10. A lip member 16 includes an antifriction roller 18 rotatably mounted on a first end of the lip member. The lip member 16 is pivotally mounted at its second end by pin 20 on the carrier beam 12. A tiedown clamp 22 is shown in its stowed or inoperative position and is pivotally mounted at a first end thereof by pin 24 to the base 10 and is capable of being manually rotated upwardly toward its operative position.

Figure 2:
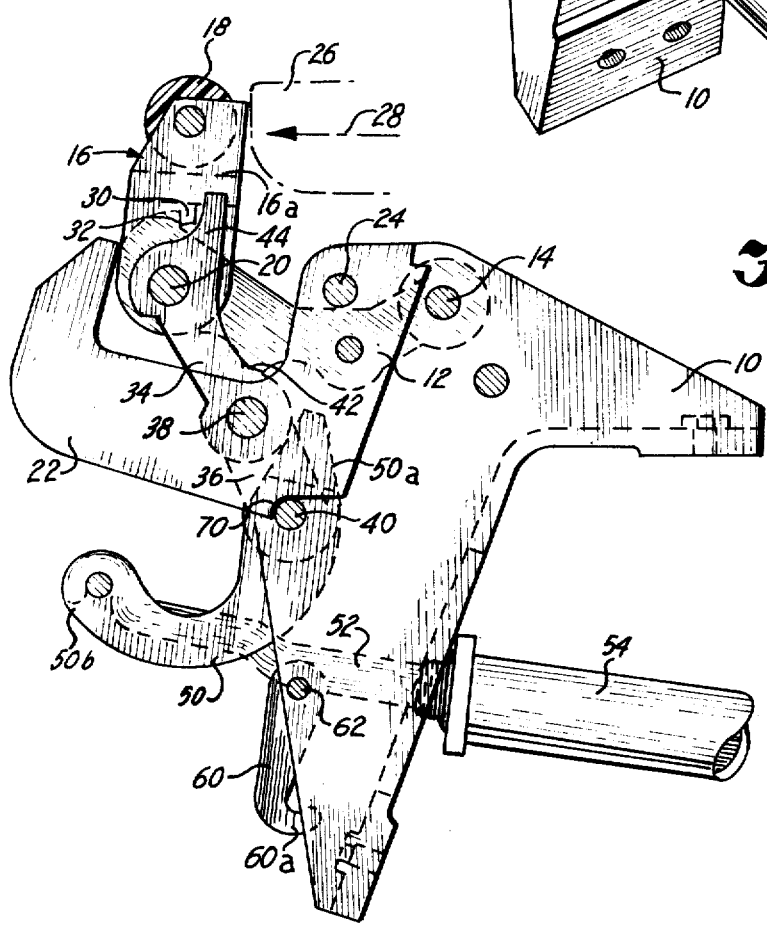
FIG. 2 is a section view of the restraint shown in FIG. 1 in its extended position.

The restraint is shown in side elevation and in cross section in FIG. 2. FIG. 2 shows the elements of the restraint positioned to restrain movement of a cargo container 26 in a first direction, as shown by arrow 28. Typically, in this configuration, the restraint would be preventing movement of the cargo container out of a cargo hold. The base 10 is adapted to be rigidly secured in a recessed portion of the cargo deck (not shown). Preferably, each of the upright members 16a, 16b of the lip member 16 includes a stop portion 30 that abuts a stop surface 32 on each of the carrier beams 12 to prevent rotation of the lip member 16 in the direction of the arrow 28. A torsion spring 33 coiled about pin 20 and acting between the lip member 16 and the carrier beam 12 functions to retain the lip member in the upstanding limit position established by the interaction of stop portion 30 and stop surface 32.

Each of the carrier beams 12 is held in the operative position shown in FIG. 2 by an associated overcenter toggle mechanism. The toggle mechanism associated with one of the carrier beams is shown in FIG. 2. A first end of an upper toggle link 34 is rotatably attached to a first end of the carrier beam 12 by the pin 20. A second end of the upper toggle link 34 is connected to a first end of a lower toggle link 36 by a pivot pin 38. The second end of the lower toggle link 36 is rotatably mounted on the base 10 by a pin 40. When the lip member 16 is extended as shown in FIG. 2 the toggle mechanism is positioned just past a dead center position wherein an upper surface of the upper link 34 contacts a stop surface 42 on the carrier beam 12. The toggle linkage is preferably biased into the overcenter position by a lower torsion spring mounted on the pin 40 and cooperating with the lower link 36. As the cargo container 26 tends to move in the direction of arrow 28, the force of the cargo container on the lip member 16 is transferred through stop portion 30 to the carrier beam 12 and tends to rotate the carrier beam in a counterclockwise direction about the mounting pin 14 as viewed in FIG. 2. Rotation of the carrier beam 12 is prevented by the toggle mechanism formed by upper and lower toggle links 34 and 36 and the load is transferred through surface 42 to the toggle links and then to the pin 40 and the base 10. The cargo container 26 is therefore prevented from movement in the direction of arrow 28 by the restraint mechanism.

Figure 3:
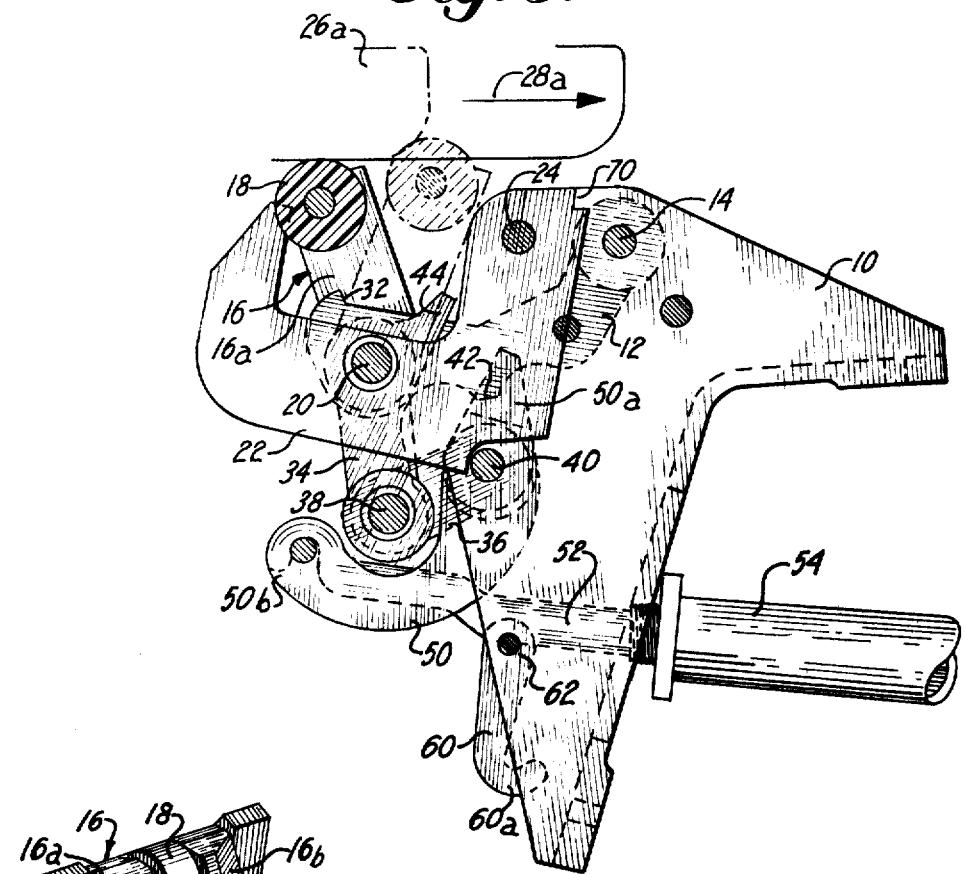
FIG. 3 is a section view similar to FIG. 2 showing the elements of the restraint positioned by the action of a container passing above the restraint.

Referring now to FIG. 3, when a cargo container 26a approaches the restraint from an opposite direction, such as when the container is being loaded into the cargo hold and moving in the direction shown by an arrow 28a, the container will impact the roller 18 and rotate the lip member 16 clockwise as viewed in FIG. 3 and shown in phantom lines. The container will cause the lip member 16 to transfer the force from the container 26a to a lug 44 which extends from the first end of the upper toggle link 34 and is adjacent the stop portion 30. The force applied to lug 44 by stop portion 30 will tend to rotate the upper toggle link 34, thereby moving the toggle mechanism from its overcenter position shown in FIG. 2, past dead center to an opposite overcenter position in a scissors-type motion. As the toggle mechanism collapses to its second overcenter position the stop surface 40 of the carrier beam 12 no longer abuts the upper toggle link 34 and is free to rotate about pin 14 away from the container under the action of downwardly-acting forces imposed on the lip member 16 by the container 26a. In this respect the action of the cargo retraint of the present invention is identical to the action of the cargo restraint shown in the Lang et al. patent.

As the lip member 16 and roller 18 move from the phantom line position downwardly under the bottom of container 26a the torsion spring 33 will automatically serve to snap the lip member back to the solid line position shown against stop surface 32. To reliably perform this function the torsion spring 33 must be sized to overcome any frictional loads involved and to provide enough force to depress the toggle mechanism which is spring-biased upwardly by the lower torsion spring associated with the pin 40. Snapping back of the lip member 16 in the direction of approach of the container 26a is highly important in order to place the lip in a position to raise behind the trailing edge of the container as soon as the trailing edge passes over the lip member. The lower torsion spring associated with pin 40 tends to straighten the toggle links and tends to move the upper toggle link upwardly to maintain the roller 18 in contact with the bottom of container 26a as the container passes over the lip member. It is necessary that the lip member snap back to its restraining position immediately after the container passes over it so that any movement of the container in a reverse direction back out of the cargo hold is prevented.

Figure 4:
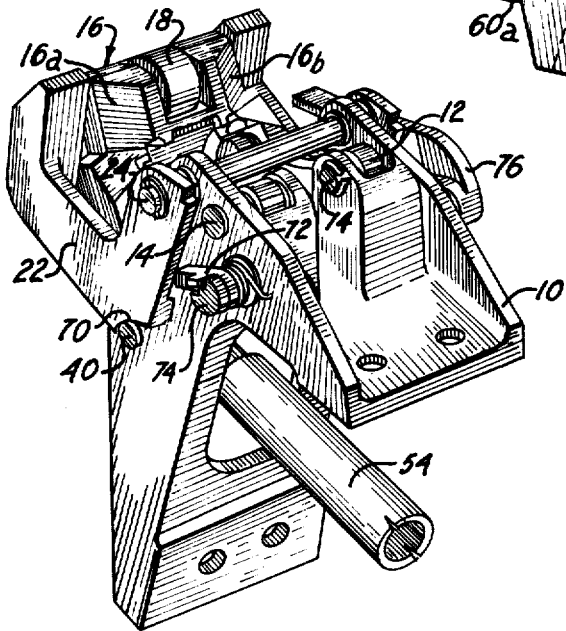
FIG. 4 is an isometric view of the restraint of FIG. 1 in its retracted position.
Figure 5:
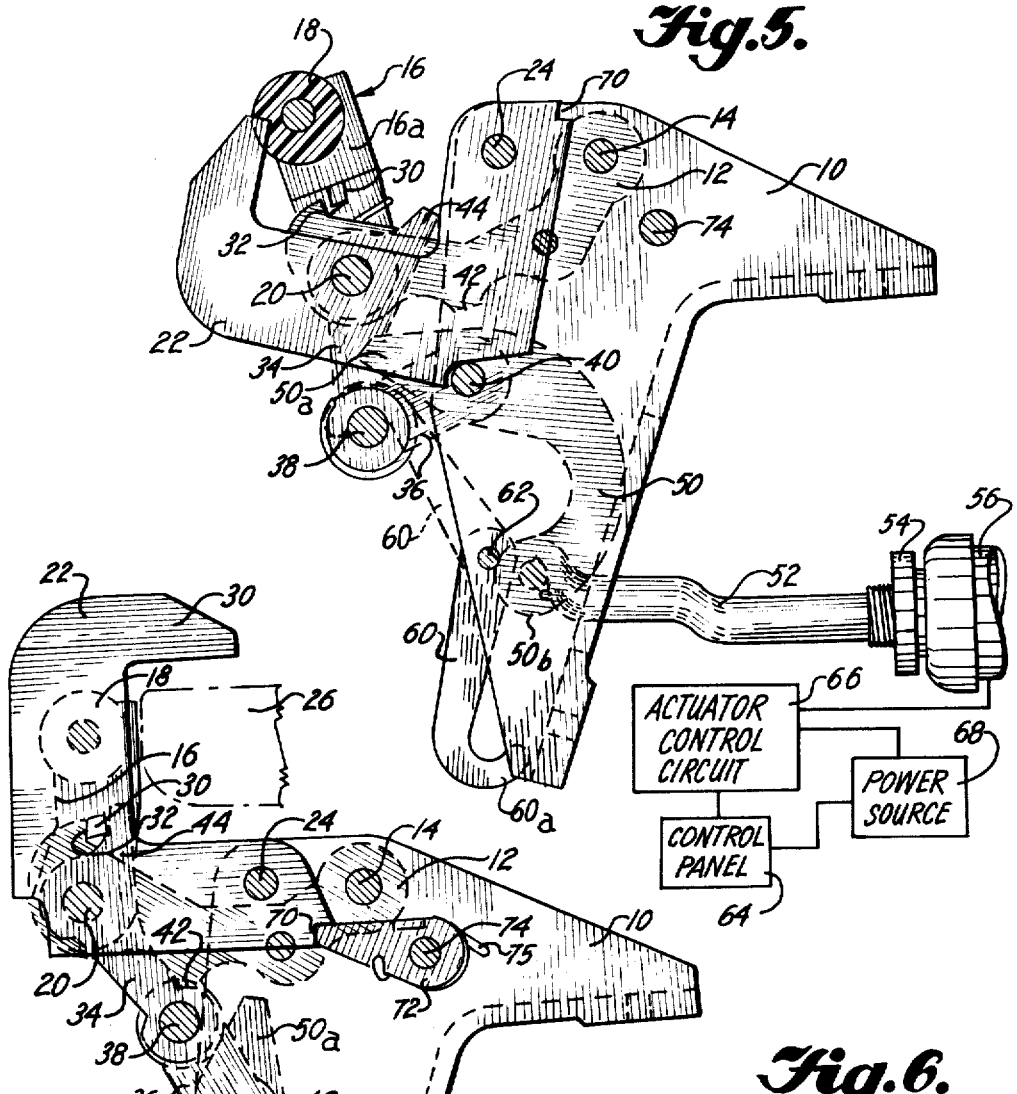
FIG. 5 is a side elevational view of the restraint in its retracted position.

Since the lip member 16 in its extended position lies in the cargo path and prevents movement of the cargo container out of the hold it is necessary when unloading cargo that the lip member be placed in a retracted position below the level of the cargo path. FIG. 4 is an isometric view of the cargo restraint of the present invention with lip member 16 in its retracted position. As best seen in FIG. 5, the lip member is retracted by the action of a retraction link 50 which has a first end 50a abutting the pin 38 which joins the upper and lower toggle links 34 and 36. A second end 50b of the retraction link is pivotably attached to a first end of an actuator link 52. A second end of the actuator link 52 is affixed to an actuator rod 54 extensible from and retactable into the body of an actuator 56. When it is desired to retract the lip member 16, the actuator rod 54 is moved to the right, as viewed in FIG. 5, carrying with it the actuator link 52 and the second end 50b of the retraction link 50. The retraction link 50 rotates about the pin 40 and the first end 50a engages the pin 38, moving it to the left and downwardly, as viewed in FIG. 5, thereby moving the toggle mechanism past its center point in scissor-like fashion such that the upper link 34 carries the carrier beam 12 downwardly about the pin 14 and draws the lip member 16 into its lowermost retracted position. When it is desired to raise the lip member 16 back into its extended position the actuator rod 54 is extended to the left by the actuator, as viewed in FIG. 5, thereby rotating the retraction link about pin 40 and moving the first end 50a of the retraction link from its position contacting the pin 38. The lower torsion spring associated with the pin 40 acts to rotate the lower link 38 in a clockwise direction about pin 40, thereby bringing the toggle mechanism back past its center position into its uppermost overcenter position forcing the lip member 16 upwardly to its extended positions.

The retraction link 50 is designed to provide simple direct connection to the actuator with any intervening linkage. The curved shape of the retraction link permits it to pass around the pin 38 as the link and pin move in conjunction with one another to operate the lip member between the extended and retracted positions. When the lip member is in its retracted position the pin 38 fits within the interior curve of the retraction link 50. The curved shape of the retraction link permits it to be used in a limited space envelope.

It should be noted that in the event the actuator 56 becomes inoperative when the rod 54 is extended from the body of the actuator, the geometry of the toggle linkage and the retraction link 50 is such that it is still possible for the toggle linkage to move in scissor-like fashion to its lowermost overcenter position. Therefore, it is possible to manually place the lip member 16 in the retracted position even though the actuator is inoperative. However, if the actuator should become inoperative in such a way that the rod 54 is retracted within the actuator body and the first end 50a of retraction link 50 is bearing against pin 38 as pictured in FIG. 5, it would not be possible to manually move the lip member 16 to its extended position. In a failure of this type it is necessary to disconnect the retraction link 50 from the actuator link 52. The retraction link 50 is then free to pivot about pin 40 without regard to the status of the actuator rod 54 and the lower bias spring associated with pin 40 is able to move the lip member 16 back to its extended position. The actuator link 52 is preferably constructed to be easily disconnected from the retraction link if necessary to permit manual operation of the restraint.

A latch hook 60 is provided, pivotally attached by means of a pin 62 to the base 10. The latch hook 60 has a hooked end 60a which preferably is constructed and arranged to engage the pin 38 when the lip member 16 is in its lowermost retracted position as shown in phantom outline in FIG. 5. Latching the pin 38 with the hook member 60 maintains the lip member in its retracted position regardless of operation of the actuator rod 54. The latch hook 60 preferably is utilized during maintenance periods and also can be utilized during unloading of cargo to maintain the mechanism in its retracted position during periods when the actuator is inoperative due to power loss or actuator failure. During such failure periods the lip member 16 can be manually forced to its retracted position by downward force applied to the lip member much like the action of a container moving into the hold. The latch member 60 is then hooked to the pin 38 to maintain the lip member in its retracted position while cargo unloading is carried out.

The actuator mechanism can be any conventional linear actuator such as a pneumatic, hydraulic or electrically-operated actuator. The retraction link 50 could also be coupled to a mechanical linkage that provided manual control of the link but was operated from a location remote from the retainer mechanism itself. In the preferred embodiment, the actuator is of the electrical type and a suitable actuator has been found to be of the type sold by Talley Corporation of Los Angeles, Calif. under part No. S452T201-1. The actuator is controlled by conventional actuation control circuitry 66 and power source 68 can be either the aircraft power or ground-supplied power. Preferably, the control panel 64 is operated by the load master from a station remote to the cargo container and the restraint mechanism itself. Therefore, the lip member 16 can be moved between its extended and retracted positions by the load master station in a location remote from the retainer mechanism.

Figure 6:
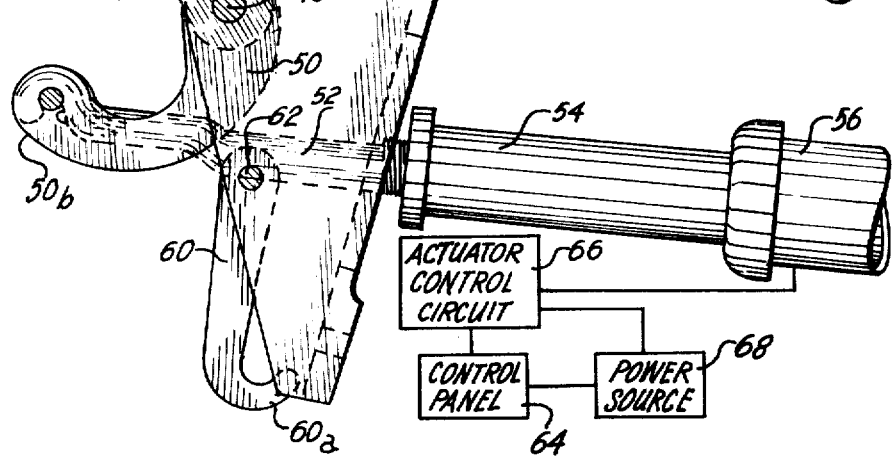
FIG. 6 is a side elevational view of the restraint in its extended position with the tiedown clamp in place.

The tiedown clamp 22 is shown in its stowed position in FIGS. 1, 2, 3, 4 and 5 and in its operative position in FIG. 6. In its stowed position detent portion 70 of the tiedown clamp 22 rests against pin 40. When the clamp is rotated upwardly to its operative position, a spring-biased pawl 72, best seen in FIGS. 4 and 6, snaps into locking engagement with the detent recess 70 formed in the tiedown clamp. The pawl 72 is mounted on a shaft 74 which passes through the base. A similar pawl and spring arrangement is mounted on the opposite side of the base 10 and is not pictured in the drawings. A pedal or lever 76 is rigidly affixed to the shaft 74 and rotation of the lever 76 will rotate the shaft 74 and thereby the pawl 72 out of engagement with the detent recess 70. The tiedown clamp can then be rotated counterclockwise back to its inoperative or stowed position. The action of the tiedown clamp 22 is essentially identical to the tiedown clamp disclosed in the Lang et al. patent.

While the invention herein has been described with reference to the preferred embodiment which was specifically designed for aircraft cargo handling systems, it will be apparent to those of ordinary skill in the art and others that the powered restraint disclosed herein may have widespread utility in other systems, for example in the handling of packages or products by a conveyor system for warehouse or factory purposes. Also, the restraint can be used in other conveyances besides aircraft, such as trucks and railroad cars. It is apparent that many modifications can be made to the preferred embodiment illustrated and described herein and, therefore, the invention is to be defined in accordance with the appended claims.

The embodiments of the invention in which an exclusive property or privilege is claimed are defined as follows:

1. A cargo restraint comprising:
   a base;
   a carrier member pivotally attached at a first end thereof to said base;
   a lip member rotatably mounted on a second end of said carrier member, said lip member being movable between a cargo-engaging position and a retracted position;
   stop means associated with said carrier member and said lip member for establishing an upstanding limit position of said lip member and preventing rotation of said lip member in a first direction;
   biasing means for biasing said lip member into said upstanding limit position;
   toggle linkage means mounted on said base and cooperative with said carrier member to prevent pivotal movement of said carrier member and to maintain said lip member in said cargo-engaging position, said toggle linkage means including a first toggle link pivotally attached at a first end thereof to said lip member, a second toggle link pivotally attached at a first end thereof to said base, a second end of said second toggle link being pivotally attached to a second end of said first toggle link at a common pivot point, said first and second links having an overcenter position in which said links cooperate to resist rotation of said carrier member;

retraction means cooperably associated with said toggle linkage means and operable to release said toggle linkage means and to move said lip member to said retracted position, said retraction means including a retraction link abutting said toggle linkage means adjacent said common pivot point, said retraction link actuatable to push said first and second toggle links out of their overcenter position and to move said carrier member to place said lip member into said retracted position; and control means associated with said retraction means and located remotely from said cargo restraint, said control means being operable to cause said retraction means to release said toggle linkage means.

2. The cargo restraint of claim 1 further including biasing means associated with said lower toggle link and said base for biasing said toggle linkage means into its overcenter position.

3. The cargo restraint of claim 1 wherein said lip member and said first toggle link are provided with interengaging surfaces for rotation of said first toggle link upon rotation of said lip member by an object moving in a direction opposite said first direction to thereby release said toggle linkage means, thereby allowing movement of said carrier means.

4. The cargo restraint of claim 1 wherein said lip member is provided with a roller arranged to extend beyond said lip member to provide a rolling contact with objects approaching said mechanism from a direction opposite said first direction.

5. The cargo restraint of claim 1 wherein said toggle linkage is manually releasable to move said lip member from its cargo-engaging position to its retracted position independently of said control means.

6. The cargo restraint of claim 1 further including a tiedown clamp pivotally mounted on said base and pawl and detente means actuatable by rotation of said tiedown clamp for locking said tiedown clamp in position to react to vertical loads from an object stowed in proximity to said mechanism.

7. The cargo restraint of claim 6 further including a lever member pivotally mounted on said base and associated with said pawl and detente means such that said pawl and detente means are released by rotation of said lever member.

8. The cargo restraint of claim 1 further including a linear actuator having an extensible and retractable rod, said rod being attached at one end thereof to said retracting link, said actuator being operable to move said retracting link to push said toggle links out of their overcenter position.

9. The cargo restraint of claim 8 further including a latching means associated with said base and operable to latch said lip member in its retracted position independent of said retraction means.

10. The cargo restraint of claim 9 wherein said latching means includes a hook member pivotally attached at one end thereof to said base, said linkage means including a pivot pin joining said second ends of said toggle links, said hook member selectively engageable with said pivot pin when said lip member is in its retracted position.

11. The cargo restraint of claim 8 or 9 wherein said linear actuator is electrically driven.

* * * * *